(12) United States Patent
Hata et al.

(10) Patent No.: US 11,601,799 B2
(45) Date of Patent: Mar. 7, 2023

(54) RADIO COMMUNICATION MODULE, RADIO TERMINAL, VEHICLE, AND CONTROL METHOD

(71) Applicant: KYOCERA Corporation, Kyoto (JP)

(72) Inventors: Mitsutaka Hata, Yokohama (JP); Yasuaki Kanai, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/181,371

(22) Filed: Feb. 22, 2021

(65) Prior Publication Data

US 2021/0185511 A1 Jun. 17, 2021

Related U.S. Application Data

(63) Continuation of application No. PCT/JP2019/032349, filed on Aug. 20, 2019.

(30) Foreign Application Priority Data

Aug. 24, 2018 (JP) .............................. JP2018-157159

(51) Int. Cl.
*H04W 8/22* (2009.01)
*H04W 4/029* (2018.01)

(52) U.S. Cl.
CPC ............. *H04W 8/22* (2013.01); *H04W 4/029* (2018.02)

(58) Field of Classification Search
CPC ....... H04W 8/22; H04W 4/029; H04W 48/04; H04W 48/12; H04W 8/18
USPC ...................................................... 455/456.4
See application file for complete search history.

(56) References Cited

U.S. PATENT DOCUMENTS

| 2003/0174354 | A1 | 9/2003 | Oteki | |
|---|---|---|---|---|
| 2004/0100932 | A1 | 5/2004 | Shiota et al. | |
| 2007/0298816 | A1* | 12/2007 | Chu | G06F 16/58 707/E17.026 |
| 2008/0259882 | A1* | 10/2008 | Abdel-Kader | H04W 48/16 370/338 |

(Continued)

FOREIGN PATENT DOCUMENTS

| JP | 2000-253431 A | 9/2000 |
|---|---|---|
| JP | 2003-284156 A | 10/2003 |

(Continued)

OTHER PUBLICATIONS

Terminal Facility or the like Rules, Ministry of Internal Affairs and Communications, [search Aug. 17, 2018], Internet <URL: http://www.soumu.go.jp/main_sosiki/joho_tsusin/tanmatsu/horei.html>.

*Primary Examiner* — Congvan Tran
(74) *Attorney, Agent, or Firm* — Studebaker & Brackett PC

(57) ABSTRACT

A radio communication module 10 includes: a radio communicator 12 configured to perform radio communication; a storage 14 configured to store set information that sets operation relating to radio communication; and a controller 13 configured to stop at least transmission operation of the radio communicator 12 or change at least a part of set information accorded to a specification of a communication carrier of a first country, when it is set so as to operate by using the set information accorded to the specification of the communication carrier of the first county and the radio communication module 10 locates in a second country different to the first country.

9 Claims, 6 Drawing Sheets

(56) References Cited

U.S. PATENT DOCUMENTS

| | | |
|---|---|---|
| 2009/0253427 A1 | 10/2009 | Fukushima et al. |
| 2015/0215844 A1* | 7/2015 | Davis .................. H04W 8/183 |
| | | 455/432.1 |
| 2016/0278087 A1* | 9/2016 | Thanayankizil ...... H04W 64/00 |
| 2016/0321642 A1* | 11/2016 | Kaufman ................ H04W 8/14 |
| 2017/0280295 A1* | 9/2017 | Tan ....................... H04W 48/18 |
| 2018/0338244 A1* | 11/2018 | Singhal ................. H04L 9/3247 |

FOREIGN PATENT DOCUMENTS

| | | |
|---|---|---|
| JP | 2004-179826 A | 6/2004 |
| JP | 2009-115662 A | 5/2009 |
| JP | 2009-253565 A | 10/2009 |
| WO | 2016/199295 A1 | 12/2016 |

* cited by examiner

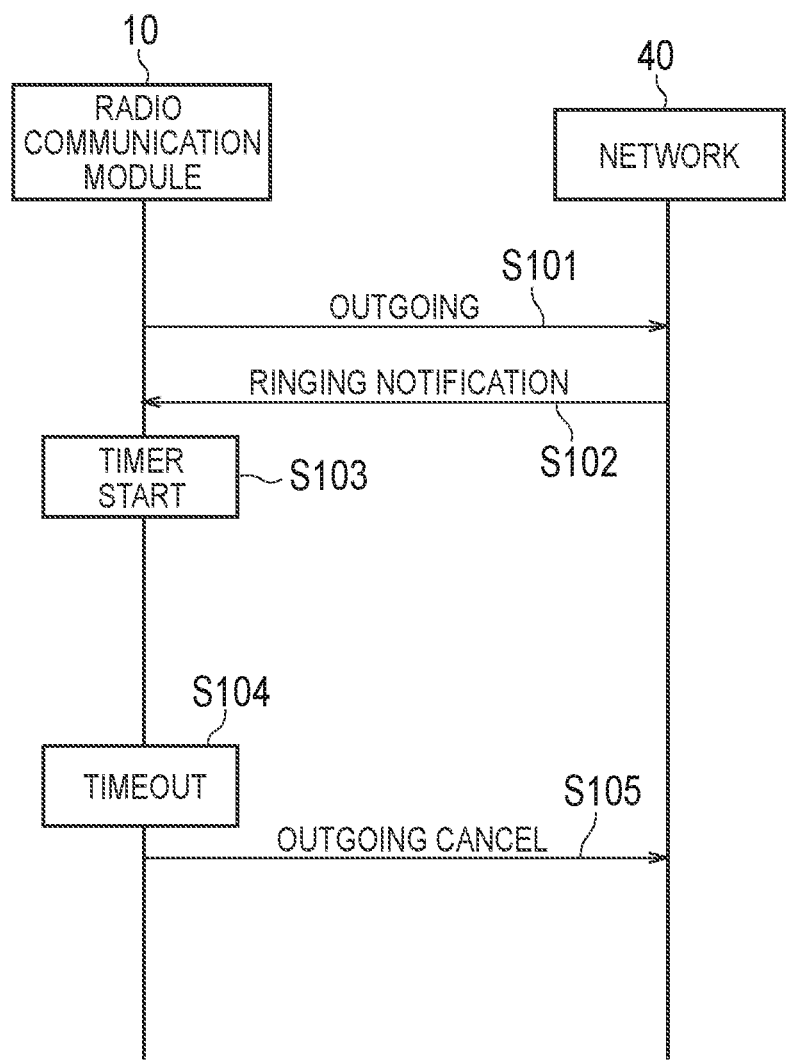

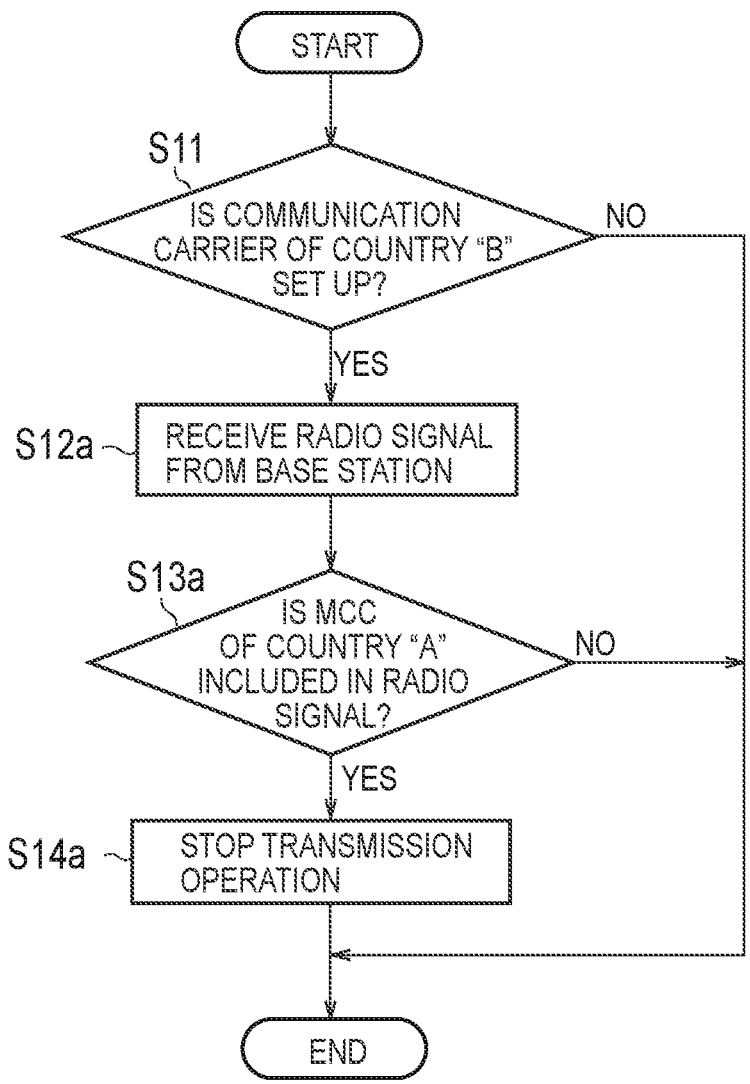

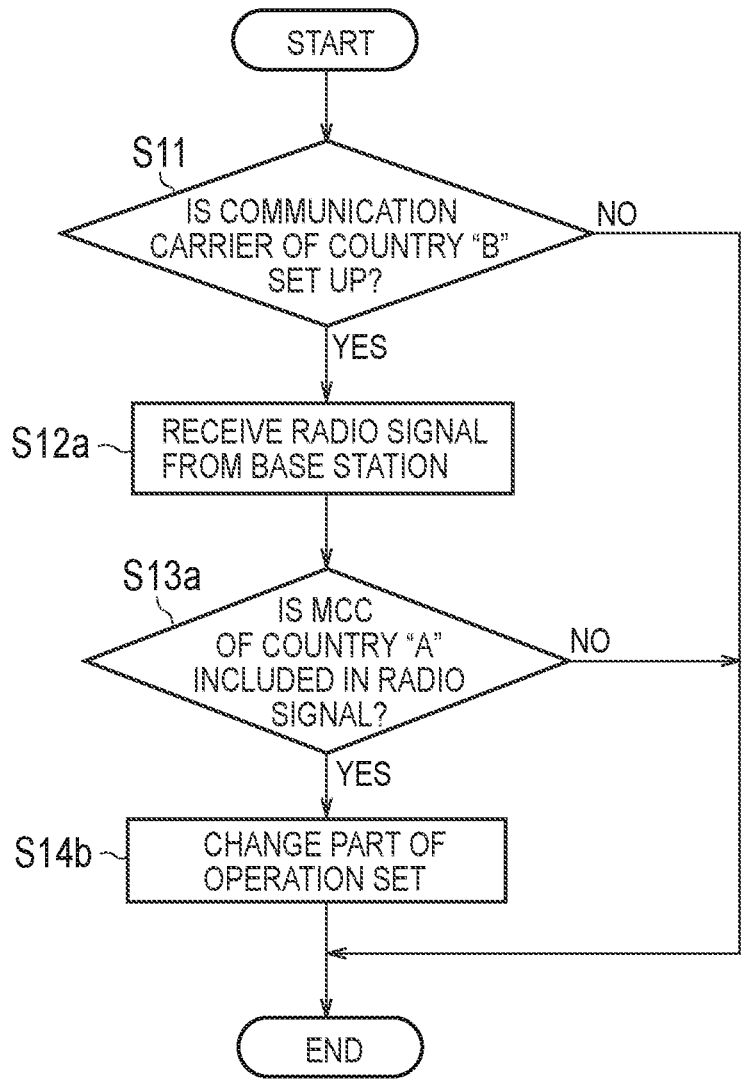

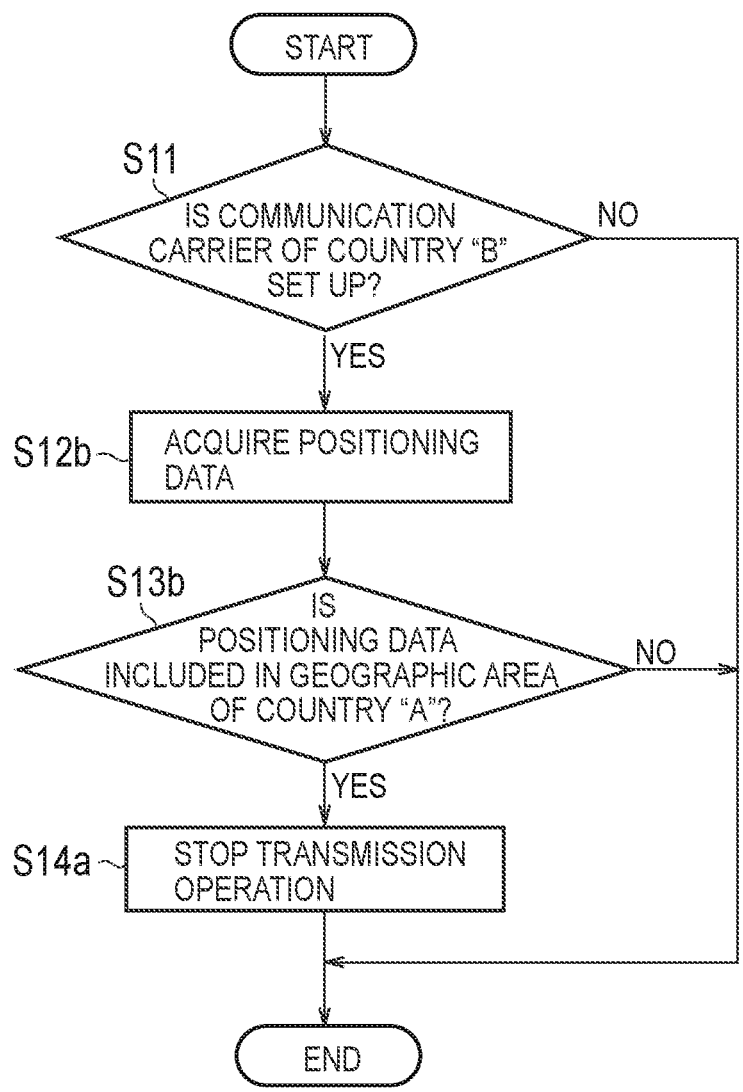

RADIO COMMUNICATION MODULE, RADIO TERMINAL, VEHICLE, AND CONTROL METHOD

RELATED APPLICATIONS

The present application is a continuation based on PCT Application No. PCT/JP2019/032349, filed on Aug. 20, 2019, which claims the benefit of Japanese Patent Application No. 2018-157159 filed on Aug. 24, 2018. The content of which is incorporated by reference herein in their entirely.

TECHNICAL FIELD

The present invention relates to a radio communication module, radio terminal, vehicle, and control method.

BACKGROUND ART

It is required that a terminal device such as a radio communication module or the like installed on a vehicle satisfies a technical standard fixed by a law of a country in which it is used.

For example, in Non-Patent Literature 1, technical standards that a terminal device should satisfy in Japan are fixed. The terminal device cannot be used in Japan unless it is approved by a certification test to meet the technical standards and the certification is obtained.

However, when a predetermined exceptional condition applies, concretely, when the terminal device is used in Japan by "a person who brings it into Japan from overseas" or when it is used in Japan by an international roaming service, it is not required that it satisfies the technical standard.

CITATION LIST

Non-Patent Literature

Non-Patent Literature 1: Terminal Facility or the like Rules, Ministry of Internal Affairs and Communications, [search Aug. 17, 2018], Internet <URL: http://www.soumu.go.jp/main_sosiki/joho_tsusin/tanmatsu/horei.html>

SUMMARY OF THE INVENTION

A radio communication module according to a first disclosure includes: a radio communicator configured to perform radio communication; a storage configured to store set information that sets operation relating to the radio communication; and a controller configured to stop at least transmission operation of the radio communicator or change at least a part of the set information accorded to a specification of a communication carrier of a first country, when it is set so as to operate by using the set information accorded to the specification of the communication carrier of the first county and the radio communication module locates in a second country different to the first country.

A radio terminal according to a second disclosure incudes: a radio communicator configured to perform radio communication; a storage configured to store set information that sets operation relating to the radio communication; and a controller configured to stop at least transmission operation of the radio communicator or change at least a part of the set information accorded to a specification of a communication carrier of a first country, when it is set so as to operate by using the set information accorded to the specification of the communication carrier of the first county and the radio communication module locates in a second country different to the first country.

A vehicle according to a third disclosure is a vehicle installed the radio communication module according to the first disclosure.

A control method according to a fourth disclosure is a method for controlling a radio communication module including a radio communicator configured to perform radio communication and a storage configured to store set information which sets operation relating to the radio communication. The control method is stopping at least transmission operation of the radio communicator or changing at least a part of the set information accorded to a specification of a communication carrier of a first country, when it is set so as to operate by using the set information accorded to the specification of the communication carrier of the first county and the radio communication module locates in a second country different to the first country.

BRIEF DESCRIPTION OF DRAWINGS

FIG. 3 is a sequence diagram illustrating an example of VoIP outgoing operation according an embodiment.

FIG. 4 is a flow diagram illustrating operation of a radio communication module according an embodiment.

FIG. 5 is a flow diagram illustrating operation of a radio communication module according a modified example 1.

FIG. 6 is a flow diagram illustrating operation of a radio communication module according a modified example 2.

DESCRIPTION OF EMBODIMENTS

There is a case of not applying to the above exceptional conditions, when a terminal device is brought to Japan for repair and used by a repairer agent, or when a person residing in Japan imports from United States of America. In this case, when a terminal device which does not satisfy a technical standard designated by a law of Japan is used in Japan, it becomes an illegal use.

Then, the present disclosure is possible to avoid the illegal use.

A radio module includes a radio communicator configured to perform radio communication, a storage configured to store set information that sets operation relating to the radio communication, and a controller configured to stop at least transmission operation of the radio communicator or modify at least a part of the set information accorded to a specification of a communication carrier of a first country, when it is set to operate by using the set information accorded to the specification of the communication carrier of the first country and the radio communication module locates in a second country different to the first country.

It will be described with reference to the drawings about the present embodiments.

(Configuration of Radio Communication System)

Figure 1:
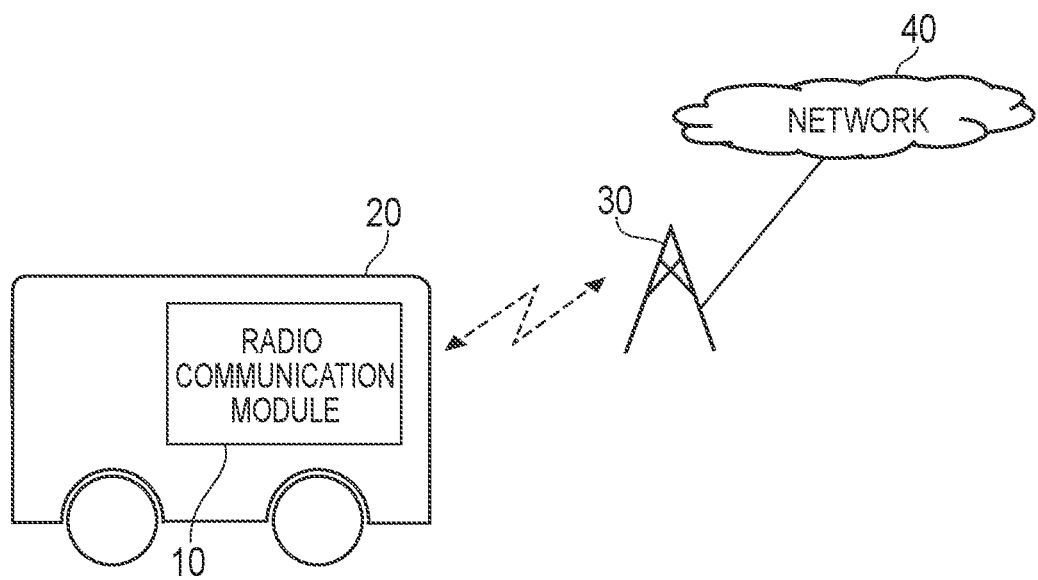
FIG. 1 is a configuration diagram of a radio communication system according to an embodiment.

FIG. 1 is a configuration diagram of a radio communication system according to the present embodiments. The radio communication system illustrated in FIG. 1 includes a vehicle 20 on which a radio communication module (or a radio communication equipment) 10 is installed, base station 30, and network 40.

The base station 30 and network 40 is provided by a communication carrier. The base station 30 may correspond to the second generation mobile communication system such as GSM (registered trade mark) (Global System for Mobile communications) or the like, the third generation mobile communication system such as CDMA (Code Division Multiple Access) or the like, or the fourth generation mobile communication system such as LTE (Long Term Evolution) or the like.

The radio communication module 10 realizes various functions. For example, the radio communication module 10 performs outgoing to a PSAP (Public Safety Answering Point) including an emergency call center at an emergency time in realizing an emergency call system. Also, after a call with an operator of the PSAP, there is a case of receiving incoming from the PSAP to the radio communication module 10. The radio communication module 10 may be possible to perform outgoing or incoming by an IP telephone by a VoIP (Voice over Internet Protocol) or the like.

Further, a telematics service that combines the vehicle 20 with a communication system and provides an information service at real time is known. In the telematics service, map data for data update of a navigation system or POI (point of interest) data is downloaded from a server on the network 40. Also, in the telematics service, diagnostic information of an on-vehicle device is uploaded to the server on the network 40. The radio communication module 10 performs such the download and upload via the network 40.

In the present embodiments, the radio communication module 10 is exemplified as an IVS (In Vehicle System) installed on a mobile body such as the vehicle 20 or the like. In the present embodiments, the vehicle 20 is described as the mobile body. Of course, the mobile body may be any moving object such as a ship, train, portable telephone, a mobile terminal (radio terminal) such as a portable telephone or a smartphone, or the like.

The radio communication module 10 may correspond to the second generation mobile communication system, the third generation mobile communication system, or the fourth generation mobile communication system. The radio communication module 10 may have various functions and a function for executing a program made by a user.

A communication carrier operating the base station 30 and network 40 provides a mobile communication service of the own carrier to a user contracted to the own carrier.

(Configuration of Radio Communication Module)

Figure 2:
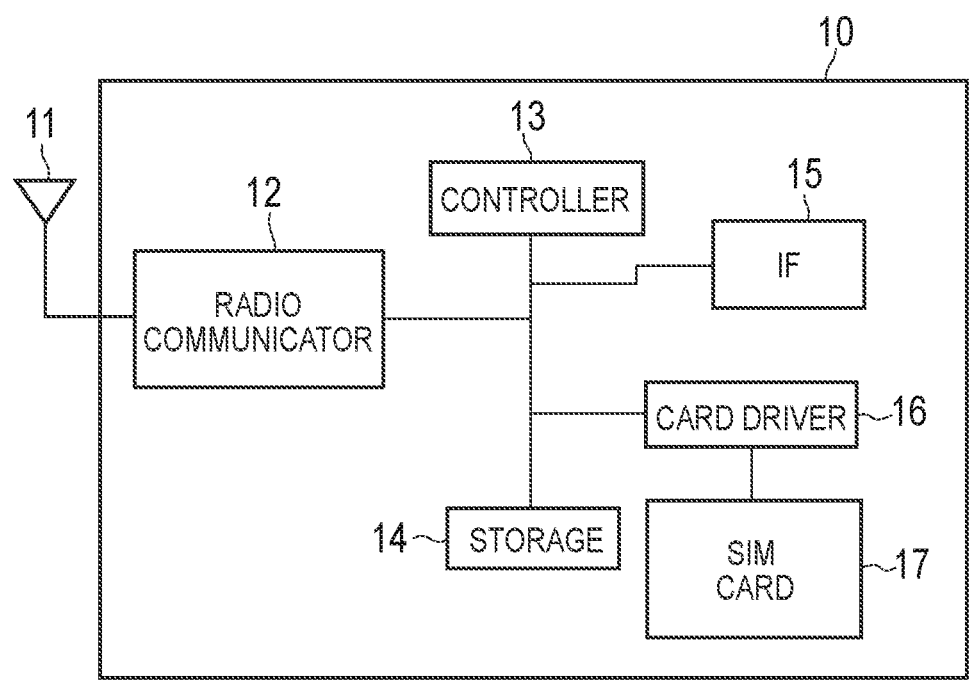
FIG. 2 is a block diagram of a radio communication module according to an embodiment.

FIG. 2 is a block diagram of the radio communication module 10 according to the present embodiments. The radio communication module 10 illustrated in FIG. 2 includes an antenna 11, radio communicator 12, controller 13, storage 14, interface (IF) 15, card driver 16, and SIM (Subscriber Identity Module) card 17.

The antenna 11 transmits and receives a radio signal to and from the base station 30.

The radio communicator 12 is a communicator for performing radio communication to the base station 30 via the antenna 11. The radio communicator 12 includes an analogue signal processor and digital signal processor.

In the analogue signal processor, as receiving operation, amplification of the radio signal received from the antenna 11, down convert, analogue to digital transform processing and so on are performed. Also, as transmitting operation, a digital to analogue transform processing of a digital signal transferred from the digital signal processor, up convert, amplifier of an analogue signal and so on are performed and the radio signal is transmitted via the antenna 11.

In digital signal processor, as transmitting operation, encoding of data transferred from the controller 13 is performed and modulation is performed so as to be able to transmit by a communication channel of the radio signal. Also, as receiving operation, demodulation and decoding of a digital signal transferred from the analogue signal processor is performed and transmission of decoded data to the controller 13 is performed.

The controller 13 is configured by a microcomputer such as a CPU (Central Processing Unit) executing various programs, ROM (Read Only Memory), RAM (Random Access Memory), backup RAM, and I/O (Input/Output) and so on, mainly, and executes various processes by executing various control programs stored in the ROM. The controller 13 executes a processing necessary to control the radio communicator 12.

The storage 14 is configured by an EEPROM (Electronically Erasable and Programmable Read Only Memory) or the like possible to rewrite content electrically, and stores a program and information necessary to control the radio communicator 12.

The storage 14 stores set information that sets operation relating to radio communication. The set information includes a set parameter relating to data communication, and set parameter relating to IP telephone and so on. The set parameter includes various timer values for example.

The IF 15 is an interface to connect electrically the radio communication module 10 to the vehicle 20 (mobile body), and is an IF of USB, any other IF or the like, for example. The IF 15 is connected to a display, microphone, speaker, navigation system, and so on installed on the vehicle 20. Further, though an automobile is exemplified as the vehicle 20, the vehicle 20 may be a motorcycle, railway vehicle, or the like.

The card driver 16 drives an IC card referred to as a SIM card (or UIM (User Identity Module) card), that is, information card. The card driver 16 takes in the SIM card 17, and may be able to take out it. When the card driver 16 receives reading out or writing to of information from the controller 13, the card driver 16 performs reading out of information recorded in the SIM card 17 or writing to the SIM card 17.

In general, the SIM card is an IC card in which information for identifying a subscriber, carrier identification information for identifying a communication carrier, information relating to an available service to which the subscriber contracts, and so on are recorded. Information necessary to receive the service is recorded in the SIM card. For example, there are various information such as information when registering position information, information relating to a telephone number (for example, telephone number of the IVS), or the like.

The SIM card 17 may be an embedded type eSIM (Embedded SIM). The SIM card 17 may be outside of the radio communication module 10. The SIM card 17 may be supplied from the communication carrier, or be obtained by other means. A user can use the radio communication module 10 by that the supplied SIM card 17 is mounted or connected to the radio communication module 10.

The controller 13 acquires set information corresponding to a communication carrier out of the set information stored in the storage 14 according to set of the communication carrier stored in the SIM card 17, and operates by using the acquired set information.

(An Example of VoIP Outgoing Operation)

It will be described about an example of VoIP outgoing operation according to the present embodiments. FIG. 3 is a sequence diagram illustrating the example of VoIP outgoing operation according to the present embodiments. Further, illustration of the base station 30 is omitted in FIG. 3.

As illustrated in FIG. 3, in Step S101, the controller 13 of the radio communication module 10 controls the radio communicator 12 so as to transmit an outgoing message to the network 40. The outgoing message may be an "INVITE" message specified by a SIP (Session Initiation Protocol).

In Step S102, the controller 13 of the radio communication module 10 receives, from the network 40 via the radio communicator 12, a notification message to notify that it is during a ringing. The notification message may be a "180 Ringing" message specified by the SIP.

In Step S103, the controller 13 of the radio communication module 10 starts a predetermined timer responding to reception of the notification message. The predetermined timer defines maximum time to wait reception of an outgoing success message. The outgoing success message may be a "2000K" message specified by the SIP.

When the outgoing success message cannot be received until the predetermined timer expires (that is, time out), the controller 13 of the radio communication module 10 determines that it is outgoing failure. Here, a set value (set time) of the predetermined timer is stored in the storage 14 as one of the set information.

In Step S104, the predetermined timer is time out.

In Step S105, the controller 13 of the radio communication module 10 controls the radio communicator 12 so as to transmit an outgoing cancel message to the network 40 responding to that the predetermined timer is time out. The outgoing cancel message may be a "CANCEL" message specified by the SIP.

(Operation of Radio Communication)

In the present embodiments, a scenario that set of a communication carrier of a particular country (hereinafter, referred to "country "B"") is stored in the SIM card 17 and the radio communication module 10 is brought from the country "B" to another country (hereinafter, referred to as "country "A"") is assumed. Here, a case that the country "A" is Japan is assumed mainly.

When the set of the communication carrier of the country "B" is stored in the SIM card 17, the radio communication module 10 (controller 13) operates according to a specification of the communication carrier of the country "B". However, there is a case that the specification of the communication carrier of the country "B" does not satisfy a technical standard designated by a law of the country "A". For example, there is a case that the above set value of the predetermined timer does not satisfy the technical standard designated by the law of the country "A".

Therefore, when the radio communication module 10 which does not satisfy the technical standard designated by the law of the country "A" is brought into the country "A" by repair or the like, or when a person residing in the country "A" imports from the country "B" to the country "A", it is against to the law of the country "A" and it becomes an illegal use.

In the present embodiments, by operation described below, it is possible to avoid the illegal use in the country "A". FIG. 4 is a flow diagram illustrating operation of the radio communication module 10 according to the present embodiments.

As illustrated in FIG. 4, in Step S11, the controller 13 determines whether or not it is set so as to operate by using set information accorded to the specification of the communication carrier of the country "B". For example, when the set of the communication carrier of the country "B" is stored in the SIM card 17, the controller 13 determines that it is set so as to operate by using the set information accorded to the specification of the communication carrier of the country "B". When a result of Step S11 is "NO", the flow ends.

When the result of Step S11 is "YES", in Step S12*a*, the controller 13 controls the radio communicator 12 so as to search and receive a radio signal transmitted from the base station 30. A system information block being a broadcast signal is included in the radio signal transmitted from the base station 30. A PLMN (Public Land Mobile Network) identifier being an identification indicating a communication carrier to which the base station 30 of a transmission source belongs is included in the system information block. Here, the PLMN identifier is configured by an MCC (Mobile Country Code) being a country code and MNC (Mobile Network Code) being a carrier code.

In Step S13*a*, the controller 13 determines whether or not the MCC of the country "A" is included in the radio signal received by Step S12*a*. For example, when the country "A" is Japan, since the MCC of Japan is "440" or "441", when the base station 30 which the MCC is "440" or "441" is observed, it is understood that the base station 30 constitutes a network of Japan. When a result of Step S 13*a* is "NO", the flow ends.

As other examples, the controller 13 may determine whether or not the MCC of a country "C" registered in the storage 14 in advance is included in the radio signal received by Step S12*a*. The country "C" may be a country that a technical standard similar to the country "A" is specified by a law, or a country that a stricter technical standard than the country "A" is specified by a law.

When the result of Step S13*a* is "YES", in Step S14*a*, the controller 13 controls the radio communicator 12 so as to stop transmission operation at least. Concretely, the controller 13 controls the radio communicator 12 so as to stop transmission of all radio signals. Herewith, the radio communication module 10 cannot become to establish radio connection with the base station 30 of the country "A". The controller 13 may control the radio communicator 12 so as to stop reception operation in addition to stop of the transmission operation.

The controller 13 may be possible to continue without stop of the reception operation in the radio communicator 12 even when stopping the transmission operation in the radio communicator 12. After stopping the transmission operation of the radio communicator 12, the controller 13 searches the radio signal by continuing the reception operation. And, it is determined whether or not the radio communication module 10 returned back to the country "B" based on the country code included in the received radio signal. When it is determined that the radio communication module 10 returned back to the country "B", the controller 13 restarts the transmission operation of the radio communicator 12.

In the way, the radio communication module 10 according to the present embodiments includes the radio communicator 12 configured to perform radio communication, the storage 14 configured to store the set information that sets operation relating to the radio communication, and stops at least transmission operation of the radio communicator 12 when it is set so as to operate by using the set information accorded to the specification of the communication carrier of a first country (country "B") and the radio communication module 10 locates in a second country (country "A" or country "C") different to the first country (country "B").

Herewith, it is possible to avoid that the radio communication module 10 is used illegally.

Modified Example 1

In the above embodiments, when it is set so as to operate by using the set information accorded to the specification of the communication carrier of the country "B" and the radio communication module 10 locates in the country "A", the controller 13 stops the transmission operation of the radio communicator 12. However, when stopping the transmission operation of the radio communicator 12, though it is possible to prohibit operation that is against to the law of the country "A", the radio communication module 10 cannot be used in the country "A" at all.

In the present modified example, when it is set so as to operate by using the set information accorded to the specification of the communication carrier of the country "B" and the radio communication module 10 locates in the country "A", the controller 13 changes set information that causes to perform operation which does not satisfy a technical standard specified by a law of the country "A" to set information that causes to perform operation which satisfies the technical standard out of the set information accorded to the specification of the communication carrier of the country "B". For example, the controller 13 changes the above set value of the predetermined timer to a value that satisfies the technical standard specified by the law of the country "A". Herewith, since it becomes not to be against to the law of the country "A", the transmission operation of the radio communicator 12 may not have to be stopped.

FIG. 5 is a flow diagram illustrating operation of the radio communication module 10 according to the present modified example.

As illustrated in FIG. 5, regarding to Steps S11 to S13a, it is same as to the flow illustrated in FIG. 4.

When a result of Step S13a is "YES", in Step S14b, the controller 13 changes the set information that causes to perform the operation which does not satisfy the technical standard specified by the law of the country "A" to the set information that causes to perform the operation which satisfies the technical standard out of the set information accorded to the specification of the communication carrier of the country "B". For example, as the above set value of the predetermined timer, a proper value that satisfies the technical standard specified by the law of the country "A" is stored in the storage 14 in advance. The controller 13 updates such that only the set value of the predetermined timer out of the set information accorded to the specification of the communication carrier of the country "B" is the proper value of the country "A".

In this way, according to the present modified example, it is possible to be able to use the radio communication module 10 in the country "A", while prohibiting the operation that is against to the law of the country "A".

Modified Example 2

In the above embodiments and modified example 1, the controller 13 grasped the country where the radio communication module 10 locates based on the radio signal received from the base station 30. However, when the radio communication module 10 includes a GNSS (Global Navigation Satellite System) receiving device, or when the radio communication module 10 acquires GNSS positioning data from a navigation system of the vehicle 20, the country where the radio communication module 10 locates may be grasped based on the GNSS positioning data.

FIG. 6 is a flow diagram illustrating operation of the radio communication module 10 according to the present modified example.

As illustrated in FIG. 6, regarding to Step S11, it is same as to the flow illustrated in FIG. 4.

When a result of Step S11 is "YES", in Step S12b, the controller 13 acquires GNSS positioning data obtained from the GNSS receiving device or GNSS positioning data obtained by the navigation system of the vehicle 20. The positioning data includes latitude and longitude.

In Step S13a, the controller 13 determines whether or not the GNSS positioning data (longitude, latitude) acquired in Step S12b is included in a geographic range of the country "A". For example, information indicating the geographic range of the country "A" is registered in the storage 14 in advance, and the controller 13 compares the GNSS positioning data acquired in Step S12b with the information indicating geographic range. When the GNSS positioning data is included in the geographic range of the country "A", it is understood that the radio communication module 10 locates in the country "A". When a result of Step S13b is "NO", the flow ends.

As another example, the controller 13 may determine whether or not the GNSS positioning data acquired in Step S12b is included in a geographic range of the country "C" registered in the storage 14 in advance. The country "C" may be a country that a technical standard similar to the country "A" is specified by a law, or a country that a stricter technical standard than the country "A" is specified by the law.

When the result of Step S13b is "YES", in Step S14a, the controller 13 controls the radio communicator 12 so as to stop at least the transmission operation. Or, the controller 13 may change a part of the set information same as the above modified example 1.

Other Embodiments

A program that causes a computer to execute each process according to the above embodiments may also be provided. Furthermore, the program may also be recorded on a computer-readable medium. If a computer-readable medium is employed, the program can be installed on a computer. Here, the computer-readable medium whereon the program is recorded may also be a non-transitory recording medium. The non-transitory recording medium is not particularly limited and may be a recording medium such as a CD-ROM or DVD-ROM, for example.

Though it is described with reference to the drawings about the embodiments in details, concrete configuration is not limited to the above, various design changes or the like are possible without deviating from the gist of the invention.

The invention claimed is:

1. A radio communication equipment comprising:
   a radio communicator configured to perform radio communication;
   a storage configured to store set information that sets operation relating to the radio communication; and
   a controller configured to stop at least transmission operation of the radio communicator when it is set so as to operate by using the set information accorded to a specification of a communication carrier of a first country and the radio communication equipment locates in a second country different to the first country, wherein after the controller is configured to stop the transmission operation of the radio communicator, when the radio communication equipment locates in the first country, the controller is configured to restart the transmission operation of the radio communicator.

2. The radio communication equipment according to claim 1, wherein
the radio communicator is configured to receive a radio signal including a country code from a base station, and
the controller is configured to determine whether or not the radio communication equipment locates in the second country based on the country code included in the radio signal received by the radio communicator.

3. The radio communication equipment according to claim 1, wherein
the controller is configured to acquire positioning data including latitude and longitude, and determine whether or not the radio communication equipment locates in the second country based on the positioning data.

4. The radio communication equipment according to claim 1, wherein
the controller is configured to change set information that causes to perform operation which does not satisfy a technical standard specified in a law of the second country to set information that causes to perform operation which satisfies the technical standard out of the set information accorded to the specification of the communication carrier of the first country.

5. The radio communication equipment according to claim 1, further comprising an interface configured to connect to a mobile body electrically, wherein
the radio communication equipment is configured to connect to the mobile body electrically by the interface.

6. A vehicle installed with the radio communication equipment according to claim 1.

7. The radio communication equipment according to claim 1, wherein
the controller is configured to: stop the transmission operation of the radio communicator; and continue without stopping a reception operation of the radio communicator.

8. A radio terminal comprising:
a radio communicator configured to perform radio communication;
a storage configured to store set information that sets operation relating to the radio communication; and
a controller configured to stop at least transmission operation of the radio communicator, when it is set so as to operate by using the set information accorded to a specification of a communication carrier of a first country and the radio terminal locates in a second country different to the first country, wherein
after the controller is configured to stop the transmission operation of the radio communicator, when the radio terminal locates in the first country, the controller is configured to restart the transmission operation of the radio communicator.

9. A control method for controlling a radio communication module including a radio communicator configured to perform radio communication and a storage configured to store set information which sets operation relating to the radio communication, the method comprising:
performing the radio communication;
stopping at least transmission operation of the radio communicator, when it is set so as to operate by using the set information accorded to a specification of a communication carrier of a first country and the radio communication module locates in a second country different to the first country; and
after stopping the transmission operation of the radio communicator, when the radio communication module locates in the first country, restarting the transmission operation of the radio communicator.

* * * * *